US010452702B2

(12) United States Patent
Dunne et al.

(10) Patent No.: US 10,452,702 B2
(45) Date of Patent: Oct. 22, 2019

(54) DATA CLUSTERING

(71) Applicant: INTERNATIONAL BUSINESS MACHINES CORPORATION, Armonk, NY (US)

(72) Inventors: Jonathan Dunne, Waterford (IE); Andrew Penrose, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 177 days.

(21) Appl. No.: 15/598,375

(22) Filed: May 18, 2017

(65) Prior Publication Data
US 2018/0336207 A1 Nov. 22, 2018

(51) Int. Cl.
*G06F 16/00* (2019.01)
*G06F 16/35* (2019.01)
*G06F 16/93* (2019.01)

(52) U.S. Cl.
CPC ............ *G06F 16/355* (2019.01); *G06F 16/35* (2019.01); *G06F 16/93* (2019.01)

(58) Field of Classification Search
CPC .............................. G06F 17/2785; G06F 17/30
See application file for complete search history.

(56) References Cited

U.S. PATENT DOCUMENTS

| 6,393,460 | B1 | 5/2002 | Gruen et al. |
| 6,727,916 | B1 | 4/2004 | Ballard |
| 7,251,696 | B1 | 7/2007 | Horvitz |
| 7,706,523 | B2 | 4/2010 | Agusta |
| 8,055,592 | B2 | 11/2011 | Boyle et al. |
| 8,190,999 | B2 | 5/2012 | Chen et al. |
| 8,539,359 | B2 | 9/2013 | Rapaport et al. |
| 8,972,868 | B2 | 3/2015 | Schubert |
| 8,990,189 | B2 | 3/2015 | Kennedy |
| 9,135,242 | B1 | 9/2015 | Wang et al. |
| 9,288,166 | B2 | 3/2016 | Scherpa et al. |

(Continued)

FOREIGN PATENT DOCUMENTS

| CN | 103401712 A | 11/2013 |
| EP | 1271341 A2 | 1/2003 |

(Continued)

OTHER PUBLICATIONS

IBM, List of IBM Patents or Patent Applications Treated as Related, Appendix P, dated Oct. 26, 2017, 2 pages.

(Continued)

*Primary Examiner* — Etienne P Leroux
*Assistant Examiner* — Farhad Agharahimi
(74) *Attorney, Agent, or Firm* — Reza Sarbakhsh

(57) ABSTRACT

A system, method and computer program product performs data analysis and clustering. A plurality of data objects are received, each represented by a vector of features and associated with a point in time. The plurality of data objects is divided into first time slices to form a plurality of consecutive sets of data objects. Each set of data objects is sub-divided into one or more second time slices so as to form one or more subsets of data objects. The data objects in each set and subset of data objects are processed to derive clusters of data objects according to similarity of features. The clusters of data objects from different sets and subsets of data objects are used to detect changes in the relevance of cluster features over time.

22 Claims, 8 Drawing Sheets

(56) References Cited

U.S. PATENT DOCUMENTS

| | | | |
|---|---|---|---|
| 2004/0111479 | A1 | 6/2004 | Borden et al. |
| 2006/0004911 | A1 | 1/2006 | Becker |
| 2009/0006377 | A1* | 1/2009 | Kobayashi .......... G06F 17/3071 |
| 2009/0055359 | A1* | 2/2009 | Gross ................ G06F 17/30867 |
| 2009/0222551 | A1 | 9/2009 | Neely |
| 2010/0174577 | A1 | 7/2010 | Duffy |
| 2010/0205541 | A1 | 8/2010 | Rapaport et al. |
| 2012/0240062 | A1 | 9/2012 | Passmore et al. |
| 2013/0151525 | A1 | 6/2013 | Ankan et al. |
| 2013/0273976 | A1 | 10/2013 | Rao et al. |
| 2014/0129510 | A1* | 5/2014 | Vladislav .......... G06F 17/30011 706/52 |
| 2014/0188536 | A1 | 7/2014 | Dasgupta |
| 2014/0278633 | A1 | 9/2014 | Daly |
| 2016/0232241 | A1* | 8/2016 | Stoyanov .......... G06F 17/30867 |
| 2016/0277574 | A1 | 9/2016 | Ristock |
| 2018/0285086 | A1 | 10/2018 | O'Malley |

FOREIGN PATENT DOCUMENTS

| | | |
|---|---|---|
| WO | 02093414 A1 | 11/2002 |
| WO | 2014022837 A1 | 2/2014 |
| WO | 2018210440 A1 | 11/2018 |

OTHER PUBLICATIONS

Pending U.S. Appl. No. 15/788,0098, filed Oct. 19, 2017, entitled: "Data Clustering", 40 pages.

IBM: List of Patents or Patent Applications Treated as Related (Appendix P), Apr. 4, 2018, 2 pgs.

Pending U.S. Appl. No. 15/788,098, entitled "Data Clustering", filed Oct. 19, 2017, 40 Pages.

Pending Patent Application No. EP2017/082335, entitled "Improved Data Clustering", Filed Dec. 12, 2017, 48 Pages.

International Search Report, International Application No. PCT/EP2017/082335, International Filing Date: Dec. 12, 2017, dated Mar. 13, 2018, 11 Pages.

Wang et al., "Context-based Message Expansion for Disentaglement of Interleaved Text Conversations", Human Language Technologies: The 2009 Annual Conference of the North American Chapter of the ACL, pp. 200-208, Jun. 2009.

Ramachandran et al., Untangling Topic Threads in Chat-Based Communication: A Case Study, Copyright 2011, 4ssociation for the Advancement of Artificial Intelligence (www.aaai.org), pp. 50-55.

Wikipedia, "Latent Dirichlet allocation", http://en.wikipedia.org/wiki/Latent_Dirichlet_allocation, printed May 16, 2017, pp. 1-7.

Wikipedia, "Markov chain Monte Carlo", http://en.wikipedia.org/wiki/Markov_chain_Monte_Carlo, printed May 16, 2017, pp. 1-7.

Elsner et al., "Disentangling Chat with Local Coherence Models", Proceedings of the 49th Annual Meeting of the Association for Computational Linguistics, Jun. 19-24, 2011, pp. 1179-1189.

Elsner et al., "Disentangling Chat", 2010 Association for Computational Linguistics, pp. 1-22.

IBM, "IBM Sametime", http://www-03.ibm.com/software/products/en/ibmsame, printed May 16, 2017 pp. 1-2.

CatchUp-Slack, https://slack.com/apps/A128G55NW-catchup, printed May 16, 2017, pp. 1-2.

Kucukyilmaz et al., "Chat mining: Predicting user and message attributes in computer-mediated communication", Science Direct, Information Processing and Management, vol. 44, Issue 4, Jul. 2008, pp. 1-2.

Mayfield et al., "Hierarchical conversation structure prediction in multi-party chat", ResearchGate, Conference paper, Jul. 2012, Conference: Proceedings of the 13th Annual Meeting of the Special Interest Group on Discourse and Dialogue, pp. 1-4.

Wikipedia, "Dijkstra's algorithm", https://en.wikipedia.org/wiki/Dijkstra's_algorithm, printed May 16, 2017, pp. 1-11.

Manning, "Last Words—Computational Linguistics and Deep Learning", 2015 Association for Computational Linguistics, doi: 10.1162/COLI_a_00239, https://en.wikipedia_org/wiki/Dijkstra's_algorithm, pp. 1-7.

Chat Disentanglement, http://www.ling.ohio-state.edu/~elsner.14/resources/chat-manual.html, printed May 16, 2017, pp. 1-4.

Mell et al., "The NIST Definition of Cloud Computing", National Institute of Standards and Technology, Special Publication 800-145, Sep. 2011, pp. 1-7.

Group Chat-Clinked, "Group Chat", https://clinked.com/features/group-chat/, printed May 16, 2017, pp. 1-4.

Anonymous, "Determining Relevant Contributor Potential to Ongoing Instant Messaging Interactions," An IP.com Prior Art Database Technical Disclosure, Oct. 15, 2015, p. 1-4, IP.com No. IPCOM000243735D.

Blei et al., "Latent Dirichlet Allocation," Journal of Machine Learning Research, 2003, p. 993-1022, vol. 3.

IBM, "System and Method for Text Based Routing and Prioritization of Support Queries," An IP.com Prior Art Database Technical Disclosure, May 30, 2008, p. 1-3, IP.com No. IPCOM000171148D.

Shen et al., "Multi-Criteria Task Assignment in Workflow Management Systems," Proceedings of the 36th Annual Hawaii International Conference on System Sciences (HICSS'03), 2003, 9 Pages, IEEE Computer Society.

* cited by examiner

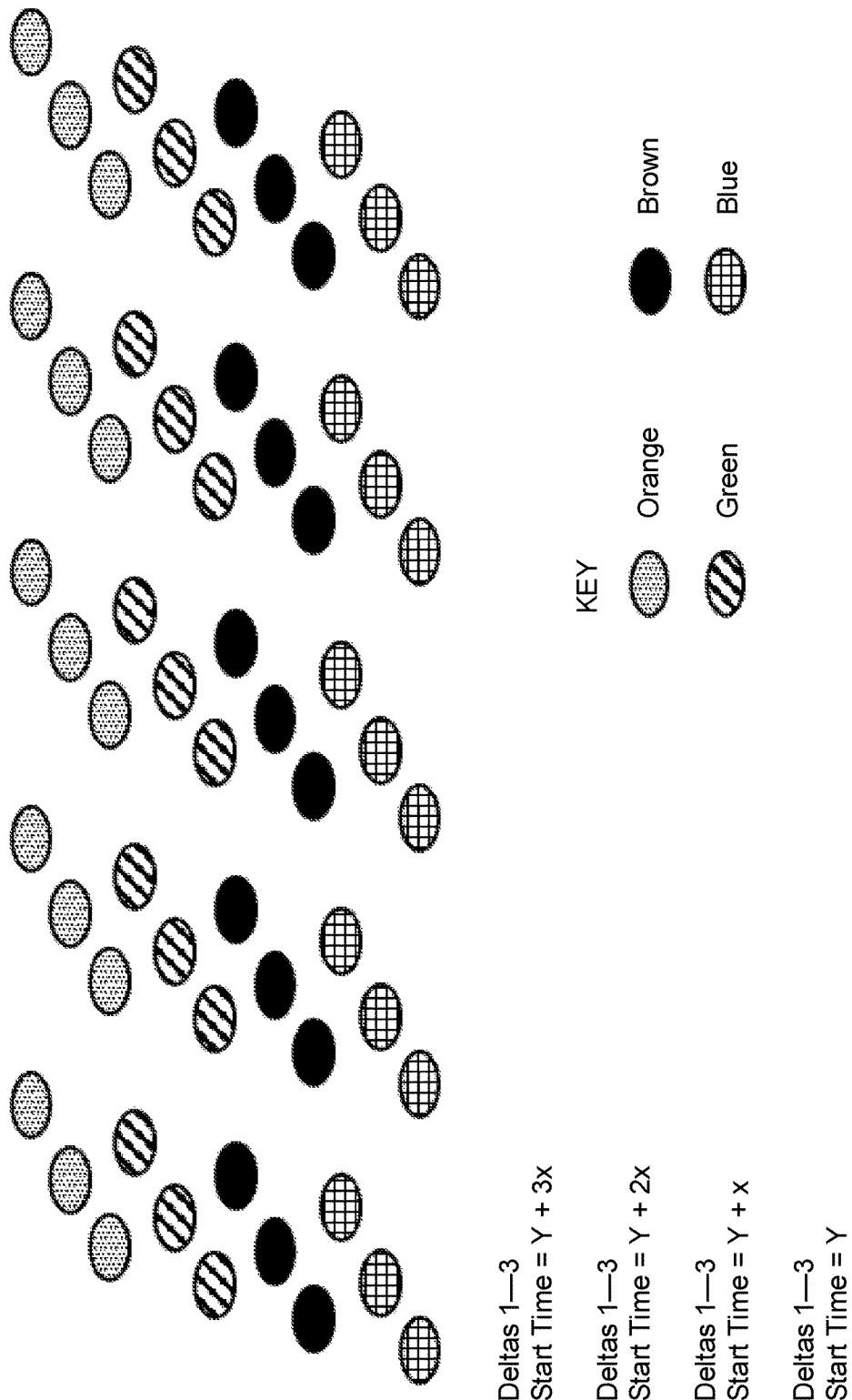

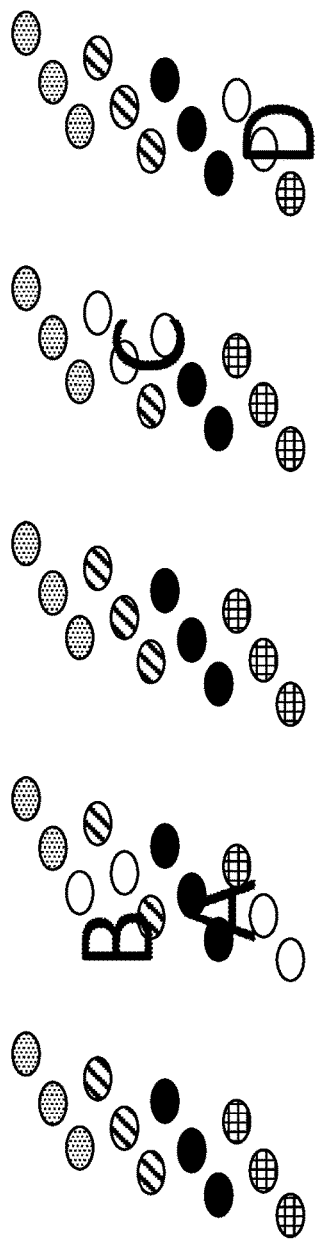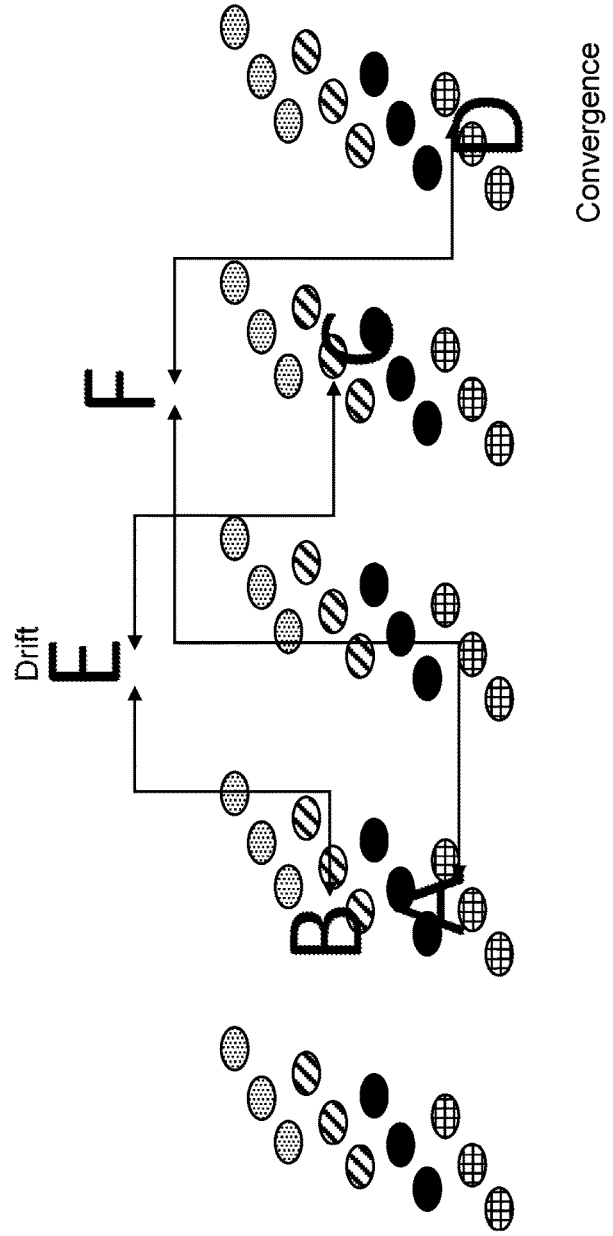

DATA CLUSTERING

BACKGROUND

The present disclosure relates to data clustering, and more specifically, although not exclusively, to clustering text-based documents according on topic or theme.

Topic analysis aims to discover the underlying topics or themes of text-based documents. Topic analysis may be desirable in numerous applications, such as in document management and retrieval. For example, processes for disentangling interleaved messages, which are exchanged in a chat messaging system or the like, may use topic analysis to identify a subset of messages that form part of a common conversation relating to a particular topic or theme over a period of time. In another example, so-called "catch-up" services for users of chat messaging systems or the like may use topic analysis for identifying a subset of messages relating to a particular user-selected topic or theme, and provide the identified messages to the user for review at a later time. Such applications benefit from the restructuring of otherwise chronologically-ordered messages into groups of similar and/or related messages. This reduces the amount of time, and consumption of communication, processing and storage resources as well as power, utilized to provide users with relevant messages, since only a group of messages needs to be retrieved and communicated to each user's device.

Manual processes for topic analysis, which may involve the use of manually labeled training data, are extremely time consuming and, in consequence, impractical for many applications. Accordingly, automated techniques for topic analysis based on topic modeling has undergone research in recent years.

U.S. Pat. No. 6,393,460 B1 concerns a method for informing a user of topics of discussion in a recorded chat between two or more people. The method involves topic analysis including decomposing the chat into utterances made by the people involved in the chat, and clustering the utterances, using document clustering techniques, to identify elements in the utterances having similar content. Some or all of the identified elements are labeled as topics and presented to the user.

U.S. Pat. No. 8,055,592 B2 concerns clustering data objects represented as a variable length vector of 0 to N members. Importance values of at least one member in the data objects are calculated. A plurality of clusters containing one or more data objects is dynamically formed. A data object is associated with a cluster in dependence upon the at least one member's similarity in comparison to members in other data objects. The clustering method is applied to chat messages, represented by a vector of most important words, to form clusters of messages on chat topics.

Journal of Machine Learning Research 3 (2003) 993-1022, David M. Blei et al, entitled "Latent Dirichlet Allocation" concerns an approach to topic analysis. In particular, it describes a generative probabilistic topic model for collections of discrete data such as text corpora, called "Latent Dirichlet Allocation" (LDA). LDA is a three-level hierarchical Bayesian model, in which each item of a collection is modeled as a finite mixture over an underlying set of topics. Each topic is, in turn, modeled as an infinite mixture over an underlying set of topic probabilities. In the context of text modeling, the topic probabilities provide an explicit representation of a document. The LDA model may be used for unsupervised clustering of documents according to the topics of their content (e.g., documents having similar relevant keywords are grouped together).

For example, a corpus of documents may be analyzed by LDA for maximum likelihood fit for a predefined number of topics. A plurality of topics may be discovered, each topic comprising a list of representative keywords (i.e., "topic terms") and each keyword having a corresponding Maximum Likelihood Estimation (MLE) score (also known as "Log likelihood value"). Typically, the representative list of keywords of a topic comprises the top N keywords ranked by MLE score, and the predefined number of topics are selected according to the sum of the MLE scores of keywords in their representative lists.

Whilst the above described methods can be used to identify underlying topics in a corpus of text documents, the results may be imprecise and produce non-homogeneous groups of documents. For example, in the case of disentanglement of chat messages, the described techniques may not accurately identify all the messages of a particular conversation, or, conversely, may identify messages that are part of a different conversation. Thus, structuring the documents into groups according to topics derived using existing topic modeling techniques may lead to a user receiving large numbers of irrelevant documents, which unnecessarily increases the use of power, as well as communication, processing and storage resources, of the user's device and the associated communication network. Conversely, structuring the documents into groups according to topics using existing topic modeling techniques may lead to a user not receiving all the relevant documents, which may lead to the user communicating additional requests for missing documents and then receiving another group of messages of which only one or a few may be relevant.

Accordingly, conventional techniques for topic analysis based on topic modeling for document management and retrieval are resource intensive and lead to inaccurate and imprecise results. In consequence, the provision of relevant documents to a user may be unnecessarily time consuming and utilize unnecessary amounts of power, as well as communication, processing and storage resources, of the user's device and communication network.

SUMMARY

According to an aspect of the present disclosure, a computer implemented method is provided.

The method receives a plurality of documents, each of the plurality of documents represented by a vector of words and associated with a point in time. The method divides the received plurality of documents into first (macro) time slices using a first time interval to form a plurality of chronologically consecutive sets of documents. The method subdivides each of the plurality of consecutive sets of documents into one or more second (micro) time slices using respective second time intervals to form one or more subsets of documents. The method identifies a plurality of topics in each of the plurality of consecutive sets of documents and the one or more subsets of documents, each of the plurality of topics represented by a set of most relevant topic keywords. The method clusters each of the plurality of consecutive sets of documents and the one or more subsets of documents in accordance with each of the identified plurality of topics. The method compares each of the identified plurality of topics with respect to each of the plurality of consecutive sets of documents and the one or more subsets of documents to detect patterns of changes in the set of most relevant topic keywords over time. The method redefines the document clusters to form more homogeneous clusters based on the identified patterns. The method in accordance with the present disclosure is able to refine the clustering of documents based on topic, to provide more precise topic groups or clusters. In particular, the documents within each cluster are more closely related to each other by topic. Structuring the documents in groups according to the redefined clusters, enables more accurate retrieval of relevant documents for provision to a user with improved efficiency. By communicating more precise groups of relevant documents to a user, the use of power, as well as communication, processing and storage resources, of the user's device and communication network, is minimized.

In example implementations, each set of documents is sub-divided into two or more consecutive overlapping time slices. In an example implementation, a start time of each second time slice is later that the start time of the corresponding first time slice by an offset time period, wherein the offset time period increases for each consecutive overlapping second time slice.

By identifying the topics for overlapping time slices that are consecutive in time, and thus which include at least some of the same messages, it is possible to infer how the topics change over time.

In example implementations, the topics from different sets and subsets of documents are compared by analyzing the topics from different sets and subsets of documents of overlapping time slices to identify patterns of changes in the relevance of topic keywords over time. For instance, a pattern of increasing relevance of one or more topic keywords represented in multiple different topics over time may be identified, indicative of topic convergence. A pattern of decreasing relevance of one or more topic keywords represented in a particular individual topic over time may be identified, indicative of topic drift.

By identifying patterns indicative of topic convergence or topic drift, it is possible to redefine the document clusters, and/or reorder documents within document clusters, to form more homogenous message clusters.

According to another aspect of the present disclosure, a system is provided. The system comprises a clustering subsystem. The clustering subsystem includes a processor for processing discrete data, and memory for storing data. The processor is configured to receive a plurality of documents, each document represented by a vector of words and associated with a point in time. The processor is further configured to divide the plurality of documents into first time slices using a first time interval to form a plurality of consecutive sets of documents. The processor is configured to sub-divide each set of documents into one or more second time slices using respective second time intervals so as to form one or more subsets of documents. The processor is further configured to identify the documents in each set and subset of documents to detect a plurality of topics, each topic represented by a set of most relevant topic keywords. The processor is configured to cluster the documents in each set and subset of documents according to topic. The processor is configured to compare the topics from different sets and subsets of documents to identify patterns of changes in the relevance of topic keywords over time. The processor is configured to redefine the document clusters to form more homogenous clusters based on the identified patterns.

According to still another aspect of the present disclosure, a computer implemented method is provided. The method receives a plurality of data objects, each data object represented by a vector of features and associated with a point in time. The method divides the plurality of data objects into first time slices to form a plurality of consecutive sets of data objects. The method sub-divides each set of data objects into one or more second time slices so as to form one or more subsets of data objects. The method processes the data objects in each set and subset of data objects to derive clusters of data objects according to similarity of features. Each cluster is represented by a most relevant set of cluster features. The method analyzes the clusters of data objects from different sets and subsets of data objects to identify patterns of changes in the relevance of cluster features over time. The method redefines the clusters of data objects to form more homogenous clusters based on the analysis.

According to yet another aspect of the present disclosure, a computer program product is provided. The computer program product comprises a computer readable storage medium having program instructions embodied therewith. The program instructions are executable by a processor to cause the processor to perform a method in accordance with one or more aspects of the present disclosure.

BRIEF DESCRIPTION OF THE DRAWINGS

Example implementations of the present disclosure will be described below with reference to the following drawings, in which:

FIG. 5 is schematic diagram depicting the results of the comparisons in FIG. 4 for multiple offset sampling iterations.

FIG. 6 is a schematic diagram equivalent to FIG. 5 depicting identified topic convergence and topic drift.

FIG. 7 is a schematic diagram equivalent to FIG. 5 depicting the re-association of messages based on the identified topic convergence and topic drift.

DETAILED DESCRIPTION

Figure 1:
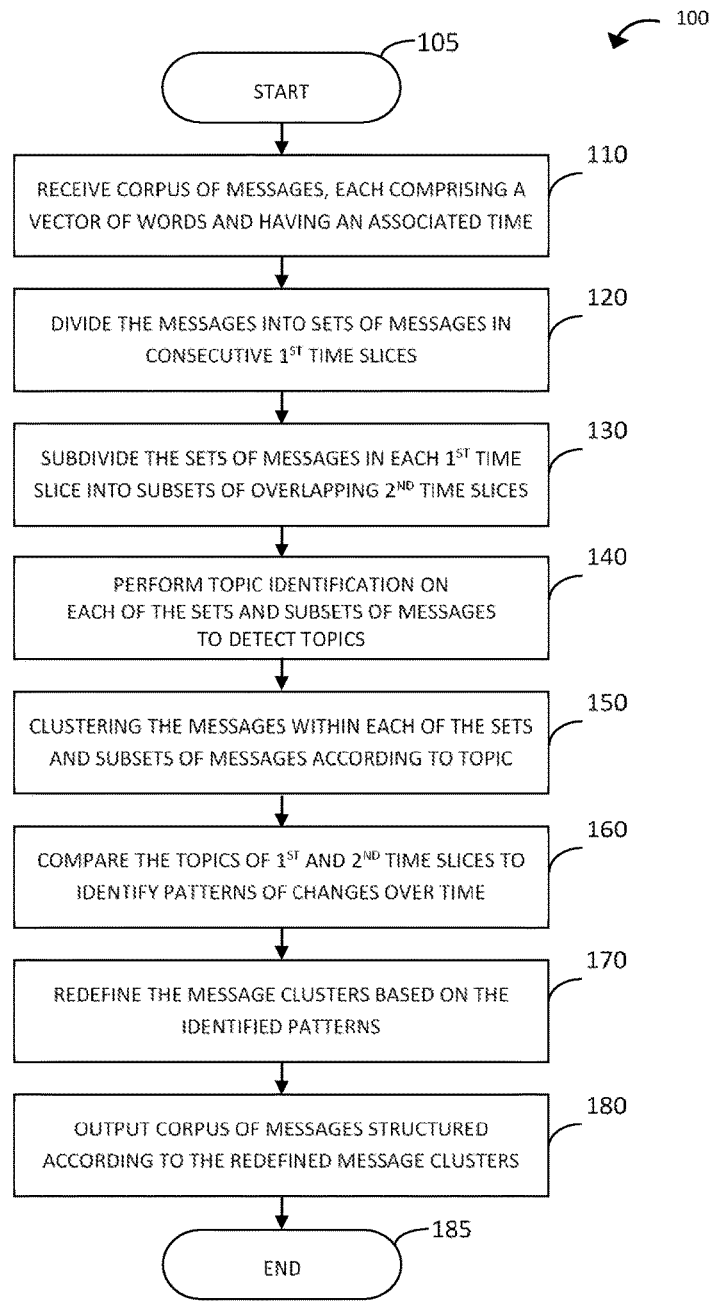
FIG. 1 is a flowchart of a method for clustering data objects comprising messages, in accordance with example implementations of the present disclosure.

The following detailed description sets out example implementations, which include specific implementation details, in order to provide the reader with a thorough understanding of the present disclosure. The skilled person will appreciate that the present disclosure is not limited to such implementation details but encompasses all suitable equivalents and alternative implementations within the scope thereof.

The present disclosure relates to systems, methods and computer program products for the analysis and clustering of data objects to provide structured and ordered groups of data objects for more efficient communication, processing and storage. In the example implementations described herein, the data objects comprise text-based documents of a corpus of documents, which are clustered or grouped according to topic or theme. As the skilled person will appreciate, the described processing techniques may be equally applied in the analysis and clustering of other types of time-based objects of discrete data, such as images and population genetics. In the following description, the term "document" is intended to encompasses text-based documents and their parts (e.g., sentences, paragraphs), messages, and other text-based data objects.

The following example implementations of the present disclosure concern the analysis and clustering of messages in a chat messaging system. Each message is associated with a particular point in time (e.g., by means of a timestamp) and comprises text-based content in the form of an ordered plurality of words. Accordingly, a message may be regarded as a data object, which may be represented by a variable length vector of words, whereby the words form features or members of the data object (i.e., message).

As the skilled person will appreciate, clustering involves organizing a set of data objects into groups, called "clusters", whose members are similar in some way. A cluster is therefore a group of data objects which are similar to each other, and which are dissimilar from data objects in other groups or clusters. Typically, a cluster comprises a group of data objects that are associated with the cluster, and similarity between the data objects is represented by a set of representative members or features of the cluster. In the case of topic clusters, the members or features of the data objects are words, and each topic has a set of representative topic keywords, as described further below. As the skilled person will also appreciate, each data object may be associated with more than one cluster.

In accordance with example implementations of the present disclosure, the data objects comprise a set of messages, where each message may be processed by natural language processing to form a message vector of significant words in the message. Topic modeling may be used to discover the underlying topics in the set of messages, each topic having a representative set of keywords (i.e., "topic terms") that form a "topic bundle". Maximum likelihood estimation (MLE) may be used to determine the likelihood of keywords being present in a topic bundle (known as "relevancy" or "relevance"). A predefined number of topics may be identified based on the MLE scores. An example method for such topic discovery is Latent Dirichlet Allocation (LDA) topic modeling for maximum likelihood fit, as described above.

Typically, in a document processing system, such as a chat messaging system that implements topic modeling, topic discovery is performed once for a corpus of documents. Since topic modeling is inherently an estimation of the topics or themes, and thus inaccurate, this may lead to inaccurate or imprecise topics and topic bundles, and, in consequence, un-homogenous message clusters (i.e., dissimilar messages within a group of messages). This is particularly true in chat messaging systems, in which topics and themes change dynamically over time.

Accordingly, the present disclosure performs topic modeling multiple times using sets and/subsets of messages from different time slices or intervals. In example implementations of the present disclosure, the sets and/or subsets of messages are from overlapping time slices, which move forward in time (i.e., time slices that are consecutive in time). Analysis of the discovered topics (i.e., topic bundles) for changes over time may identify patterns of increasing and/or decreasing relevance of keywords within topics over time. The patterns may then be used to determine more precise topics and topic bundles. In this way, the messages may be structured or grouped according to topic with improved precision, so as to optimize the use of resources associated with the communication, processing and storage of messages.

FIG. 1 is a flowchart of a method 100 for clustering of documents in accordance with example implementations of the present disclosure. The method 100 may be performed by one or more modules, components and/or subsystems of a clustering system for structuring the documents in topic clusters or groups with increased precision for improved efficiency. In the illustrated method, the documents comprise representations of time-stamped messages of a chat messaging system, which are clustered in accordance with the method 100 based on topic or theme.

The method 100 starts at step 105. At step 110, the method receives a corpus of messages, for example from the chat messaging system. Each message is represented by a vector of words (called here "message vector") and is associated with a point in time (e.g., timestamp), as described above. The messages are typically received and processed in chronological order, but are otherwise unstructured. As the skilled person will appreciate, a raw text-based message is typically pre-processed (e.g., using a natural processing engine) to form a variable length vector of words, which may be normalized to a pre-defined fixed-length vector format of 0 to N words, corresponding to the N most important words in the message (e.g., most frequently occurring words).

At step 120, the method divides the message vectors into consecutive first (macro) time intervals of fixed length T. Thus, step 120 produces a plurality of first (macro) time slices, each comprising a set of message vectors that are associated with points in time during the corresponding first (macro) time interval T.

At step 130, the method subdivides the first (macro) time slices T into one or more second (micro) time intervals of length t, which is less than T (i.e., t<T). In example implementations, step 130 subdivides the first (macro) time slice T into two or more overlapping second (micro) time intervals of different lengths t, whereby each second (micro) time interval is offset from a point in time (e.g., start or end) of the first (macro) time interval by a different amount of time. Thus, for each first (macro) time slice T, step 130 produces one or more second (micro) time slices t, each comprising a subset of message vectors that are associated with points in time during the corresponding second (micro) time interval t.

As the skilled person will appreciate, steps 120 and 130 produce message samples, each comprising the set or subset of message vectors associated with the corresponding sampling time slice or interval (T or t). Each of these message samples is processed further, as described below.

At step 140, the method performs topic identification, using each of the message samples (i.e., the set of messages in each first (macro) time slice T and the subset of messages in each second (micro) time slice t), to discover or detect topics. Step 140 may use any suitable topic modeling or similar technique for discovering the underlying topics of the respective set or subset of messages of the message sample. For example, step 140 may analyze the messages using LDA topic modeling for maximum likelihood fit, in accordance with a predefined number of topics. The LDA topic modeling, in conjunction with maximum likelihood estimation (MLE), identifies the predefined number of topics for each of the message samples, where each of the topics comprises a list of representative topic keywords (known in LDA as "term list") corresponding to the most frequently occurring words for the topic (e.g., keywords having the highest MLE scores), as described above.

At step 150, the method clusters the messages of the message samples of each first (macro) time slice T and each second (micro) time slice t according to the identified topics. In particular, step 150 may associate the messages of each of the message samples with the identified topics based on the words of the message vectors and the representative keywords of the topics. Step 150 may use any suitable technique for inferring the association of a message with one or more topics and the corresponding measure (e.g., proportion) of association of the message with an individual topic. Thus, step 150 may be considered as building a topic map or multi-layer graph that associates messages with topics for multiple overlapping (macro and micro) time slices.

At step 160, the method compares the topics, comprising topic bundles of representative keywords and associated MLE scores, produced in step 140 across different time slices (i.e., message samples) to identify patterns of changes in topics over time. In particular, step 160 may compare topics across different time slices to identify patterns of increasing or decreasing relevance of representative keywords of topics over time.

For example, step 160 may compare the topics, comprising the representative topic keywords and associated MLE scores thereof, across different time slices to identify a pattern of decreasing keyword relevance in a topic over time, herein called "topic drift". Topic drift corresponds to a reduction in the likelihood of representative keywords being present in an individual topic or topic bundle over time. In particular, step 160 may compare the topics from each first (macro) time slice T with the topics from each overlapping second (micro) time slice t. Furthermore, step 160 may compare the topics from adjacent/consecutive overlapping second (micro) time slices t within the same first (macro) time slice T. Moreover, step 160 may compare the topics from a first (macro) or second (micro) time slice with the topics from another, typically adjacent, consecutive and/or overlapping, first (macro) or second (micro) time slice. In any event, step 160 may compare topics derived by topic modeling using the message samples of different adjacent, consecutive and/or overlapping time slices by comparing the MLE scores of matching representative keywords over time, in order to determine a measure of the reduction of the MLE scores of keywords in a topic bundle over time (i.e., "topic drift"). Further details about topic drift are provided below.

In another example, step 160 may compare the topics, comprising the representative topic keywords and associated MLE scores thereof, produced in step 140 across different time slices to identify a pattern of increasing keyword relevance in multiple topics (i.e., topic bundles) over time, herein called "topic convergence". Topic convergence corresponds to an increase in the likelihood of the same representative keywords being present in separate topic bundles over time. Accordingly, step 160 may compare topics derived from different first (macro) time slices T and second (micro) time slices t in a variety of ways, for example as discussed above in relation to topic drift. Step 160 typically compares topics derived by topic modeling using the message samples of different consecutive, adjacent and/ or overlapping time slices by comparing the MLE scores of matching representative keywords over time, in order to determine a measure of the increase of the MLE scores of keywords in topic bundles over time (i.e., "topic convergence"). Further details about topic convergence are provided below.

At step 170, the method redefines the message clusters based on the identified patterns, such as topic drift and/or topic convergence. In particular, step 170 may re-associate messages with clusters (i.e., groups of topics) and/or reorder messages within clusters based on the determined topic drift and/or topic convergence (e.g., based on identified patterns of increasing or decreasing MLE scores of representative keywords of topics over time). Step 170 may re-associate messages with clusters when topic drift and/or topic convergence is identified and according to the level of topic drift and/or topic convergence (e.g., whether the increase or decrease in MLE scores of representative keywords over time exceeds a predefined threshold indicative of "high" topic drift or "high" topic convergence, respectively). In example implementations, messages associated with two or more topics that have high topic convergence may be re-associated with a single topic to form a more homogeneous message cluster. The single message cluster may be associated with a new topic or a merged topic, based on a combination of the representative keywords of each of the two or more topics. The messages in the single cluster forming a topic group are therefore more homogenous. In other example implementations, a subset of messages associated with a topic that has high topic drift may be re-associated with a separate new topic. The separate new topic may comprise representative keywords consistent with a new topic or theme. The subset of messages associated with the new topic may form a more homogeneous cluster (i.e., topic group), and, similarly, the subset of messages that remain associated with the original topic may form a more homogeneous topic group. In example implementations, for example when topic drift or topic convergence is identified at lower level (e.g., below the abovementioned predefined threshold) messages may be reordered within a cluster based on MLE scores of representative keywords. For example, messages associated with a cluster having the same keywords with the same or similar MLE scores, and thus relating to the same theme within the relatively stable topic cluster, may be reordered so that messages having the same theme are closer together within a cluster, rather than moved to a separate new cluster.

At optional step 180, the method may output the corpus of messages structured in accordance with the redefined clusters provided in step 170, and thus as a structured set of topic groups for use in management and retrieval of the messages. The method ends at step 185.

As the skilled person will appreciate, the method 100 may be repeated iteratively. For example, the method may be repeated iteratively using a start time for message sampling that is offset by a time period x from the start time Y of the first iteration (where the offset x is less that T and preferably less than t). In another example, the method may be repeated iteratively using further second (micro) time slices t' of reduced size (i.e. t'<t). Thus, message samples from subsequent iterations may overlap message samples from preceding iterations. In any event, the method may be repeated iteratively using different first (macro) time slices and/or second (micro) time slices. Such iterative repetitions may be appropriate when no patterns of topic convergence and/or topic drift are identified and/or a threshold level is not satisfied. Each iteration may be performed as part of a feedback loop, following the possible identification of topic drift and/or topic convergence and redefining of clusters, in the previous iteration. The use of feedback loops may be appropriate to achieve a desired degree of confidence in the resulting redefined clusters.

As the skilled person will appreciate, step 160 involves analysis to identify patterns of changes in MLE scores (or equivalent) of topic keywords over time, which may identify or detect topic drift (corresponding to reducing MLE scores of topic keywords over time) and/or topic convergence (corresponding to increasing MLE scores over time). Accordingly, step 160 may be divided into two separate steps, one to identify patterns of changes which represent topic drift and the other to identify patterns of changes which represent topic convergence.

Further details of how the method 100 of FIG. 1 may be used in example implementations of the present disclosure are described below with reference to FIGS. 2-7.

Figure 2:
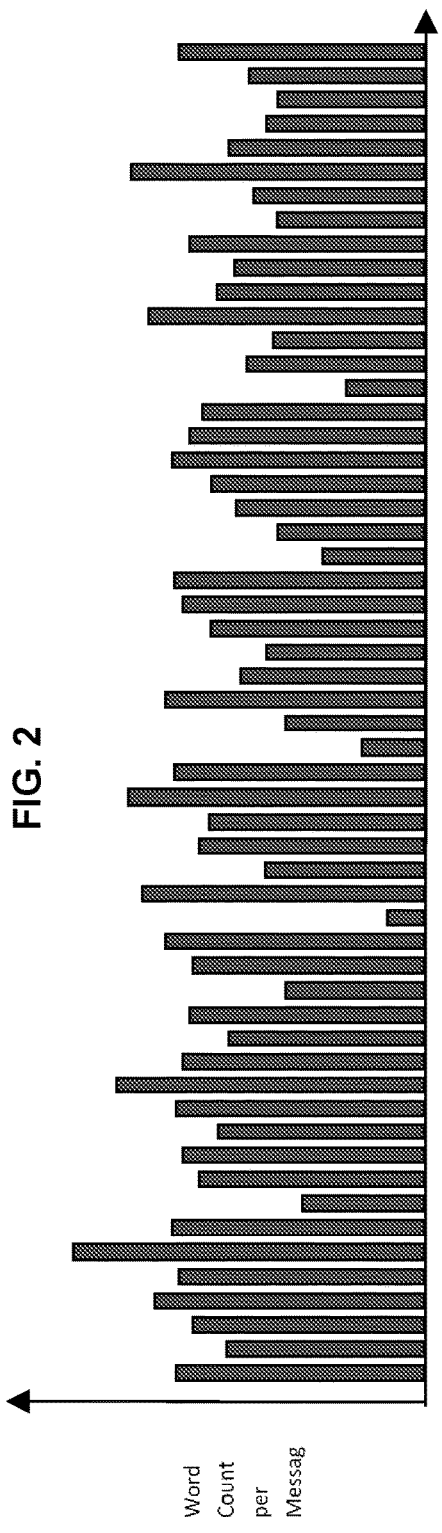
FIG. 2 is a graph of word count vs. time that illustrates an example plot of messages of a chat messaging system.

FIG. 2 is a graph of word count vs. time, showing a plot of messages sent by multiple users of a chat messaging system over a continuous time period. The graph of FIG. 2 is representative of a corpus of messages received from a chat messaging system in step 110 of the method 100 of FIG. 1, as described above.

Figure 3:
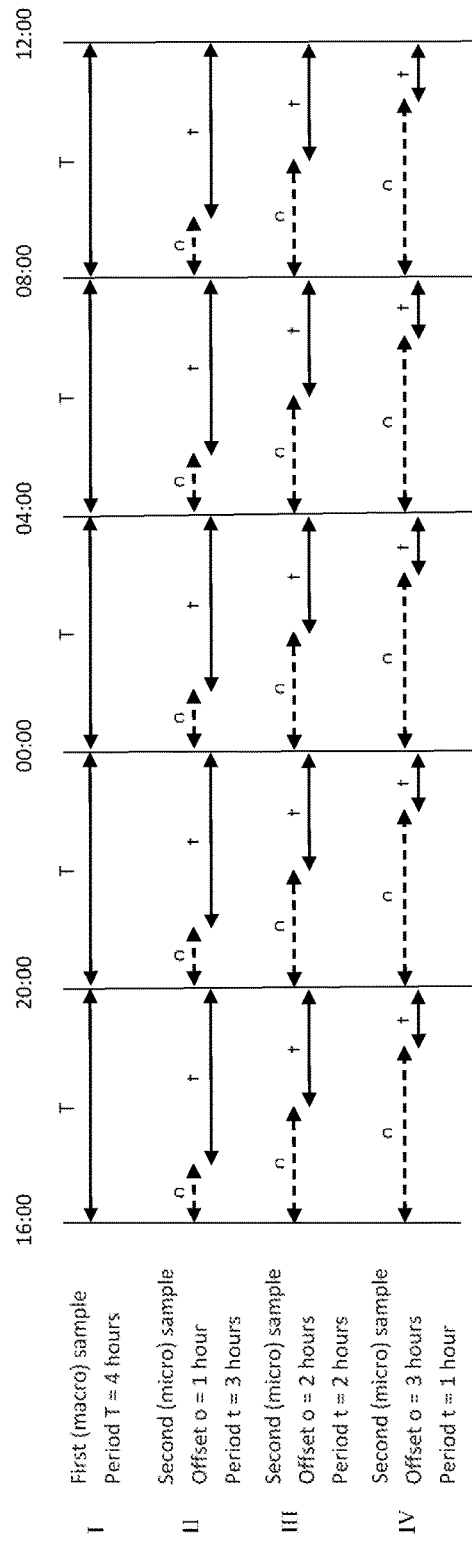
FIG. 3 is a chart showing the sampling of the messages depicted in FIG. 2 in accordance with example implementations of the present disclosure.

FIG. 3 is a chart showing the sampling of the messages shown in FIG. 2, using first (macro) time intervals and consecutive, overlapping second (micro) time intervals, in accordance with an example implementation of the present disclosure. The sampling is an example of the processing performed in steps 120 and 130 of the method of FIG. 1. The chart shows four different horizontal lines representing four different sampling intervals I, II, III & IV. Whilst the sampling illustrated in FIG. 2 has just four different sampling intervals, as the skilled person will appreciate, any number of different sampling intervals may be used based on application and/or user requirements. In particular, the top line I of the chart of FIG. 3 shows sampling of the messages based on a first (macro) sampling interval T of 4 hours and a start time Y. Thus, from left to right in the chart, the first sample comprises the messages in the time slice between 16:00 and 20:00 in FIG. 2 (where 16:00 is the start time Y), the second sample comprises the messages in the time slice between 20:00 and 00:00 and so on, with the fifth and last sample comprising the messages in the time slice between 08:00 and 12:00. The second through fourth lines II-IV in the chart of FIG. 3 show sampling of the messages based on different consecutive second (micro) time intervals t that overlap with the first (macro) time intervals T and reduce in duration (i.e., time interval t). The start time of each consecutive second (micro) sampling interval t is later than, and, in particular, offset by a time period o from, the start time of the first (macro) sampling interval, where the offset time period o increases for each consecutive overlapping second (micro) sampling interval t. Accordingly, the second line II in the chart of FIG. 3 shows sampling of the messages based on a second (micro) sampling interval t of 3 hours, where sampling starts at an offset o of 1 hour. Similarly, the third line III in the chart of FIG. 3 shows sampling of the messages based on a second (micro) sampling interval t of 2 hours, where sampling starts at an offset o of 2 hours. Finally, the fourth line IV in the chart of FIG. 3 shows sampling of the messages based on a second (micro) sampling interval t of 1 hour, where sampling starts at an offset o of 3 hours. Thus, sampling using each of the second (micro) time intervals t produces samples comprising messages in respective 3, 2 and 1 hour long consecutive and overlapping time slices between 16:00 and 12:00 of FIG. 1. As the skilled person will appreciate, the sampling times (i.e., start/end time and duration) shown in FIG. 3 are for illustration purposes only. In example implementations, any suitable sampling intervals may be used according to application and/or user requirements.

As described further below with reference of FIGS. 4 and 5, in example implementations of the present disclosure, the sampling at the first (macro) and second overlapping (micro) time intervals may be repeated iteratively, using different starting times, such as successively later starting times. Thus, if a first iteration of sampling has a start time Y, a second iteration of sampling may start at time Y+x, where x is 20 minutes, for example. A third iteration of sampling may start at time Y+2x and a fourth iteration may start at time Y+3x and so on.

In accordance with example implementations of the present disclosure, the message samples (i.e., sets and subsets of messages in the time slices) derived from each of the sampling intervals I-IV are analyzed using topic analysis to discover a plurality of topics, in accordance with step 140 of the method of FIG. 1, as discussed above. Thus, for each message sample/time slice, the analysis (e.g., using LDA with MLE) identifies a predefined number of topics or topic bundles comprising a set of representative topic keywords and corresponding MLE scores. The messages may then be associated with the identified topics by message clustering, in accordance with step 150 of the method of FIG. 1, as discussed above. The topics derived using different sampling intervals/time slices are then analyzed for topic drift and/or topic convergence in accordance with step 160 of the method of FIG. 1, as discussed below.

In example implementations of the present disclosure, the analysis in accordance with step 160 may first determine delta differences between identified topics for the first (macro) sample/time slice T and the corresponding second (micro) sample/time slices t with advancing time. In particular, the analysis may compare matching representative keywords in the identified topics of different adjacent, consecutive and/or overlapping message samples. The analysis may determine delta differences in the MLE scores of matching representative keywords of topics with advancing time. The delta differences (also called "deltas" herein) may be used to identify patterns of changing relevance (i.e., MLE score) of keywords in identified topics over time. In particular, the analysis may identify patterns corresponding to either decreasing relevance of keywords in an individual topic over time (i.e., topic drift) or increasing relevance of keywords in multiple topics over time (i.e., topic convergence).

Figure 4:
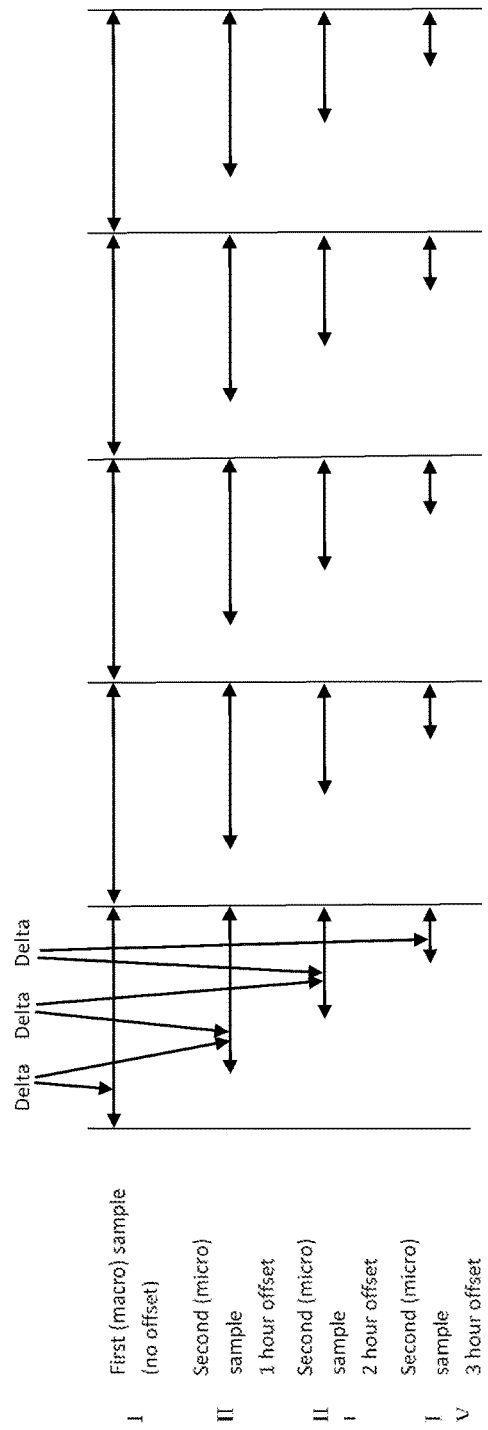
FIG. 4 is a chart depicting comparisons between the message samples from FIG. 3, in accordance with example implementations of the present disclosure.

FIG. 4 is a chart depicting the determination of delta differences between identified topics from overlapping consecutive messages samples derived by the sampling (I-IV) of messages within the time interval 16:00 to 20:00 of a first iteration (i.e., where the starting time Y is 16:00) shown in FIG. 3, in accordance with an example implementation. In particular, a first comparison compares the identified topics from the message samples in lines I and II to determine a first delta difference ("delta 1"), a second comparison compares the identified topics from the message samples in lines II and III to determine a second delta difference ("delta 2"), and a third comparison compares the identified topics from the message samples in lines III and IV to determine a third delta difference ("delta 3"). Since the message samples for lines I-IV relate to periods that start later in time, each of deltas 1-3 represents a positive or negative difference in data values associated with identified topics over time. As discussed above, in example implementations of the present disclosure, the delta differences (i.e., deltas 1-3) are determined by comparing the MLE scores (or equivalent) of the same representative keywords of topics identified from different message samples, where an MLE score represents the likelihood that the corresponding keyword appears in a topic or topic bundle. In addition, although not shown in FIG. 4, three additional iterations of the sampling (I-IV) of messages may be performed with starting times at Y+x, Y+2x and Y+3x, and corresponding comparisons performed to produce corresponding deltas 1-3 for each iteration. Since the message samples from successive iterations relate to periods that start later in time, the corresponding deltas 1-3 determined by comparing the identified topics derived from message samples from successive iterations represent positive or negative differences in the data values (e.g., the MLE scores of the same representative keywords) associated with identified topics over time. As mentioned above, the deltas within each iteration and/or within successive iterations, relating to overlapping and/or consecutive message samples, may be used to determine topic drift and/or topic convergence, as described in further detail below.

FIG. 5 is a schematic diagram showing the deltas derived from the comparisons shown in FIG. 4 over multiple iterations. The bottom row of ovals in FIG. 5 represent the deltas differences shown in FIG. 4 in a first iteration (i.e., start time Y) for each of the five first (macro) 4 hourly time intervals between 16:00 and 12:00 of FIGS. 2 and 3. In particular, the three (blue) ovals in the bottom row represent the first, second and third comparisons (deltas 1-3), respectively for the five first (macro) time intervals. The next row of ovals in FIG. 5 represent the corresponding deltas shown in FIG. 4 in a second iteration (i.e., start time Y+x), with the three (brown) ovals representing the first, second and third comparisons (deltas 1-3), respectively for the five first (macro) time intervals. The next row of ovals in FIG. 5 represent the corresponding deltas shown in FIG. 4 in a third iteration (i.e., start time Y+2x), with the three (green) ovals representing the first, second and third comparisons (deltas 1-3), respectively for the five first (macro) time intervals. Finally, the top row of ovals in FIG. 5 represent the deltas shown in FIG. 4 in a fourth iteration (i.e., start time Y+3x), with the three (orange) ovals representing the first, second and third comparisons (deltas 1-3), respectively for the five first (macro) time intervals. As the skilled person will appreciate, further sampling iterations may be performed and used for determining topic drift and/or topic convergence according to application and/or user requirements.

As mentioned above, topic analysis based on topic modeling of the message samples identifies a predefined number of topics, where each topic or topic bundle comprises a representative set of keywords and corresponding MLE scores (or equivalent). Delta differences, such as deltas 1-3 shown in FIGS. 4 and 5, may be appreciated by reference to the following Tables 1-3.

Table 1 below shows an example of the topics identified using a method implementing LDA for maximum likelihood fit with an input parameter defining four (4) topics, for example using the set of messages in a first (macro) time slice T (i.e., the first (macro) message sample from line I in FIG. 4) in the time period 16:00 to 20:00. In particular, Table 1 shows four topics (topics 1-4) and their corresponding topic bundles comprising six representative keywords or topic terms (i.e., 6 most relevant keywords based on MLE score) and associated relevancy score (i.e., MLE score). As the skilled person will appreciate, MLE provides a data value or score between 0 and 1, where 0 represents a null probability/likelihood and 1 represents a 100% probability/likelihood.

TABLE 1

Topics from Sample I (first (macro) sample)

| Topic 1 | | Topic 2 | | Topic 3 | | Topic 4 | |
|---|---|---|---|---|---|---|---|
| Topic Term | MLE Score | Topic Term | MLE Score | Topic Term | MLE Score | Topic Term | MLE Score |
| server | 0.567 | ios | 0.787 | ipad | 0.787 | conversation | 0.787 |
| firefox | 0.234 | message | 0.565 | message | 0.567 | ios | 0.667 |
| chrome | 0.233 | android | 0.454 | android | 0.435 | mobile | 0.566 |
| update | 0.189 | team | 0.345 | mobile | 0.344 | android | 0.456 |
| servers | 0.177 | mqtt | 0.133 | push | 0.232 | cache | 0.232 |

Table 2 below shows an example of the topics identified by the same method as Table 1, using the subset of messages in a second (micro) time slice t (i.e., the first of the second (micro) message samples from line II in FIG. 4) in the time period 17:00 to 20:00. As the skilled person will appreciate, this second (micro) time slice fully overlaps the first (macro) time slices. The MLE scores of the representative keywords of the topics shown in bold have changed in comparison with Table 1.

TABLE 2

Topics from Sample II (second (micro) sample)

| Topic 1 | | Topic 2 | | Topic 3 | | Topic 4 | |
|---|---|---|---|---|---|---|---|
| Topic Term | MLE Score | Topic Term | MLE Score | Topic Term | MLE Score | Topic Term | MLE Score |
| server | 0.337 | ios | 0.787 | ipad | 0.787 | ios | 0.787 |
| chrome | 0.335 | message | 0.565 | message | 0.567 | conversation | 0.567 |
| firefox | 0.254 | mqtt | 0.353 | android | 0.454 | mobile | 0.461 |
| update | 0.189 | team | 0.345 | mobile | 0.314 | android | 0.454 |
| servers | 0.177 | android | 0.193 | push | 0.232 | cache | 0.232 |

Table 3 below shows the delta difference, delta 1, determined based on the comparison of the identified topics derived from LDA topic modeling of corresponding overlapping message samples, as shown in Tables 1 and 2. In particular, the delta difference is determined by calculating an average change in MLE score of a topic term in the topics 1-4. Thus, for each topic term that has changed, the delta difference may be calculated as the sum of the MLE score changes divided by the number of changes.

TABLE 3

Delta 1 determined by comparison of topics in Tables 1 & 2

| Topic Term | Average Difference in MLE Score (delta 1) |
|---|---|
| mqtt | +0.220 |
| ios | +0.120 |
| chrome | +0.102 |
| firefox | +0.020 |
| mobile | −0.068 |
| conversation | −0.220 |
| server | −0.230 |
| android | −0.081 |

As shown in Table 3, the keyword (i.e., topic term) "ios" has a positive delta difference in MLE score of +0.120. This indicates that the word "ios" has become more relevant in the messages over time, since the MLE score has increased. Moreover, the keyword "ios" appears in two separate topics, topics 2 and 4, as shown in Tables 1 and 2. Thus, convergence of topics 2 and 4 into a single topic may be inferred.

Such an inference may depend on the correspondence between the other keywords in the separate topics and/or a continuing pattern of increasing MLE score of the common keywords of the separate topics over time. Such a pattern of increasing MLE score may be identified based on further positive delta differences, for the same common keywords in topics 2 and 4, from deltas 2 and 3, as described above.

Similarly, as shown in Table 3, the keyword (i.e., topic term) "server" has a negative delta difference in MLE score of −0.230. This indicates that the word "server" has become less relevant in the messages over time, since the MLE score has decreased. Moreover, the keyword "server" appears in only a single topic, topic 1, as shown in Tables 1 and 2. Thus, topic drift of topic 1 may be inferred. Such an inference may depend on a continuing pattern of decreasing MLE score of the keyword "server" and/or other keywords of topic 1 over time. Such a pattern of decreasing MLE score may be identified based on further negative delta differences, for the same keywords of topic 1, from deltas 2 and 3, as described above.

As previously described, the method as described with reference to FIG. 1, may output the corpus of messages structured in accordance with the redefined clusters provided in step 170, and thus as a structured set of topic groups for use in management and retrieval of the messages. The results from the improved clustering techniques according to the present invention may be used to define drift templates for use in simulation and other relevant processes, as described below. As the skilled person will appreciate, such output and simulation may be displayed, for example, using systems as described with reference to FIG. 8, below.

FIG. 6 is schematic diagram similar to FIG. 5, in which topic convergence and topic drift have been identified. In particular, topic convergence has been identified for the groups of deltas shown as white ovals in the areas of the diagram labeled A, B, C and D. In particular, the two white ovals in area A show the identification of topic convergence from samples in the second of the five first (macro) time intervals of the first iteration (i.e., start time Y) based on analysis of the deltas. In particular, the deltas 1 and 2 may show a pattern of increasing MLE score of representative keywords in two or more topic bundles of the relevant samples (i.e., each of deltas 1 and 2 shows a positive delta difference in MLE score of keywords appearing in two or more topics). This corresponds to topic convergence. Messages associated with the two or more separate topics or topic bundles, and thus including the representative keywords in their message vectors, may therefore be identified as more closely related to each other.

Similarly, the two white ovals in area B show the identification of topic convergence from message samples in the second of the five first (macro) time intervals of the third and fourth iterations (i.e., start time Y+2x and Y+3x, respectively) based on analysis of the deltas. The three white ovals in area C show the identification of topic convergence from message samples in the fourth of the five first (macro) time intervals of the second and third iterations (i.e., start time Y+x and Y+2x, respectively) based on analysis of the deltas. Finally, the two white ovals in area D show the identification of topic convergence from message samples in the fifth of the five first (macro) time intervals of the first iteration (i.e., start time Y) based on analysis of the deltas.

Topic drift is also identified from the groups of deltas shown in each of areas labeled A-D of FIG. 6. In particular, the deltas 1 and 2 in area A may show a pattern of decreasing MLE score of one or more keywords of a topic bundle of the relevant samples (i.e., each of deltas 1 and 2 shows a negative delta difference in MLE score of one or more keywords appearing in a topic). This corresponds to topic drift. Messages associated with the particular topic or topic bundle that have the representative keyword(s) of decreasing relevance, may therefore be identified as unrelated to other messages but, instead, may relate to a separate topic. Thus, a new topic bundle F may be created for those messages as shown in FIG. 7. Similarly, topic drift may be identified in areas B, C and D and messages identified and moved to new topic bundles E and F as shown in FIG. 7.

In accordance with example implementations of the present disclosure, the results of the analysis to identify topic convergence and/or topic drift may be used to redefine the message clusters in accordance with step 170 of the method of FIG. 1. In particular, the messages may be reordered into messages grouped according to topic based on the re-defined clusters and/or messages may be reordered within topic groups, which may be output in accordance with step 180 of the method of FIG. 1. By using the method in accordance with the present disclosure, the messages are grouped, and ordered within the groups, more accurately compared with the use of conventional clustering techniques. This higher degree of clustering precision is obtained for improved structuring (i.e., grouping) of the messages according to topic or theme, for use in message management and retrieval.

The results from the improved clustering techniques according to the present invention may be used to define drift templates for use in simulation and other relevant processes. In particular, as explained above, probabilistic topic modelling (e.g., using LDA) is an unsupervised approach, which discovers topics from documents, how the topics are interconnected and how they change over time, without any prior knowledge thereof. A drift template, based on previous analysis of documents of a certain type, may be used as a form of feedback to provide such prior knowledge when analyzing documents of the same or similar type. Thus, a user may select a suitable drift template for such use as starting iteration for analysis of documents of a similar type in a particular scenario.

Figure 8:
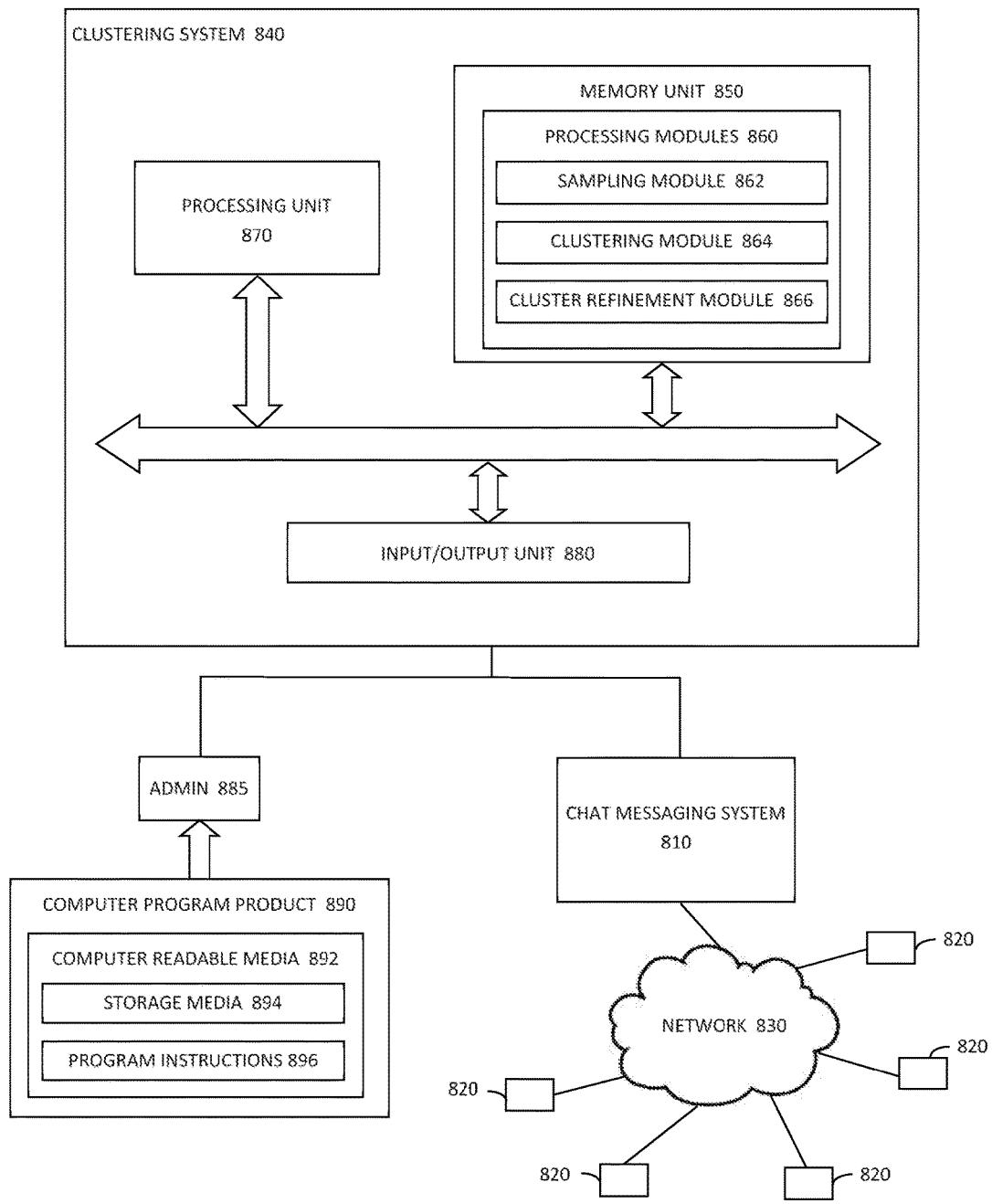
FIG. 8 depicts a system in accordance with example implementations of the present disclosure.

FIG. 8 is a system 800 in accordance with example implementations of the present disclosure. The system 800 comprises a chat messaging system 810 such as a server and a plurality of user devices 820 such as client devices accessing the chat messaging system 810 over a data communications network 830. Users of client devices 820 send messages to each other via the chat messaging server 810 and each client device receives and stores a history log of the chat messages of conversations associated with the corresponding user. The system 800 further comprises a clustering system 840 associated with chat messaging system 810, for processing the messages of the chat messaging system according to topic or theme, using methods in accordance with example implementations of the present disclosure.

In particular, clustering system 840 comprises a memory unit 850, a processing unit 870 and an Input/Output (I/O) unit 880. I/O unit 880 provides a communications interface for data communication with the chat messaging system 810 and, optionally, an administrator device 885 and network 830. Memory unit 850 stores processing modules 860 for processing chat messages received from chat messaging system 810 in accordance with example implementations of the present disclosure. In particular, processing modules 860 comprise sampling module 862, clustering module 864 and cluster refinement module 866. Sampling module 862 receives a corpus of unstructured, chronological messages and divides them into samples according to first (macro) and second (micro) time intervals, for example as in steps 110 to 130 of the method 100 of FIG. 1 and/or as shown in FIGS. 2 and 3. Clustering module 864 performs topic analysis and clustering of the messages within each sample (i.e., time slice) according to topic or theme, for example as in steps 140 and 150 of the method 100 of FIG. 1. Cluster refinement module 866 performs refinement of clusters based on analysis and identification of patterns of changes in topics over time (e.g., topic drift and/or topic convergence), for example as in steps 160 and 170 of the method 100 of FIG. 1 and/or as shown in FIGS. 4 through 7.

In example implementations of the present disclosure, a computer program product 890 may be provided, as shown in FIG. 8. The computer program product 890 may include a computer readable media 892 having storage media 894 and program instructions 896 (i.e., program code) embodied therewith. The program instructions 896 may be loaded onto memory unit 850 of clustering system 840 via I/O unit 880, for example by a user of administrator device 885. The program instructions 896 may comprise any one or more of the above-described processing modules 860, including sampling module 862, clustering module 864 and cluster refinement module 866 of clustering system 840. The program instructions 896 may be executable by the processing unit 870 of clustering system 840 to perform chat message processing in accordance with example implementations of the present disclosure, as described above.

As discussed above, the structuring of chronologically-ordered, but otherwise unstructured, messages into groups of similar and/or related messages based on topic with improved accuracy (i.e., more homogeneous groups) in accordance with example implementations of the present disclosure has a number of technical advantages. In particular, only the groups of messages relevant to a particular user need to be selectively retrieved and communicated to, and stored in the history log of, each user's device by the chat messaging system. Thus, the chat messaging may select and provide each user with all (and only) the relevant messages (i.e., a group of messages associated with a topic) in a single session for storage in the history log. The user does not need to engage in additional sessions to retrieve additional messages, or to filter out irrelevant messages, due to imprecise message clustering. Accordingly, the amount of time to provide each user with relevant messages is minimized. In addition, the consumption of communication, processing and storage resources of a user's device and network is minimized, as well as the power utilized thereby. In example implementations of the present disclosure, the structuring of messages may be performed by a centralized or distributed processing system that operates in parallel to the chat messaging system (e.g., as a parallel and/or concurrent "microservice"). Thus, the principles of the present disclosure are lightweight and scalable to a wide variety of applications in different contexts and scenarios.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the one or more embodiment, the practical application or technical improvement over technologies found in the marketplace, or to enable others of ordinary skill in the art to understand the embodiments disclosed herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 9:
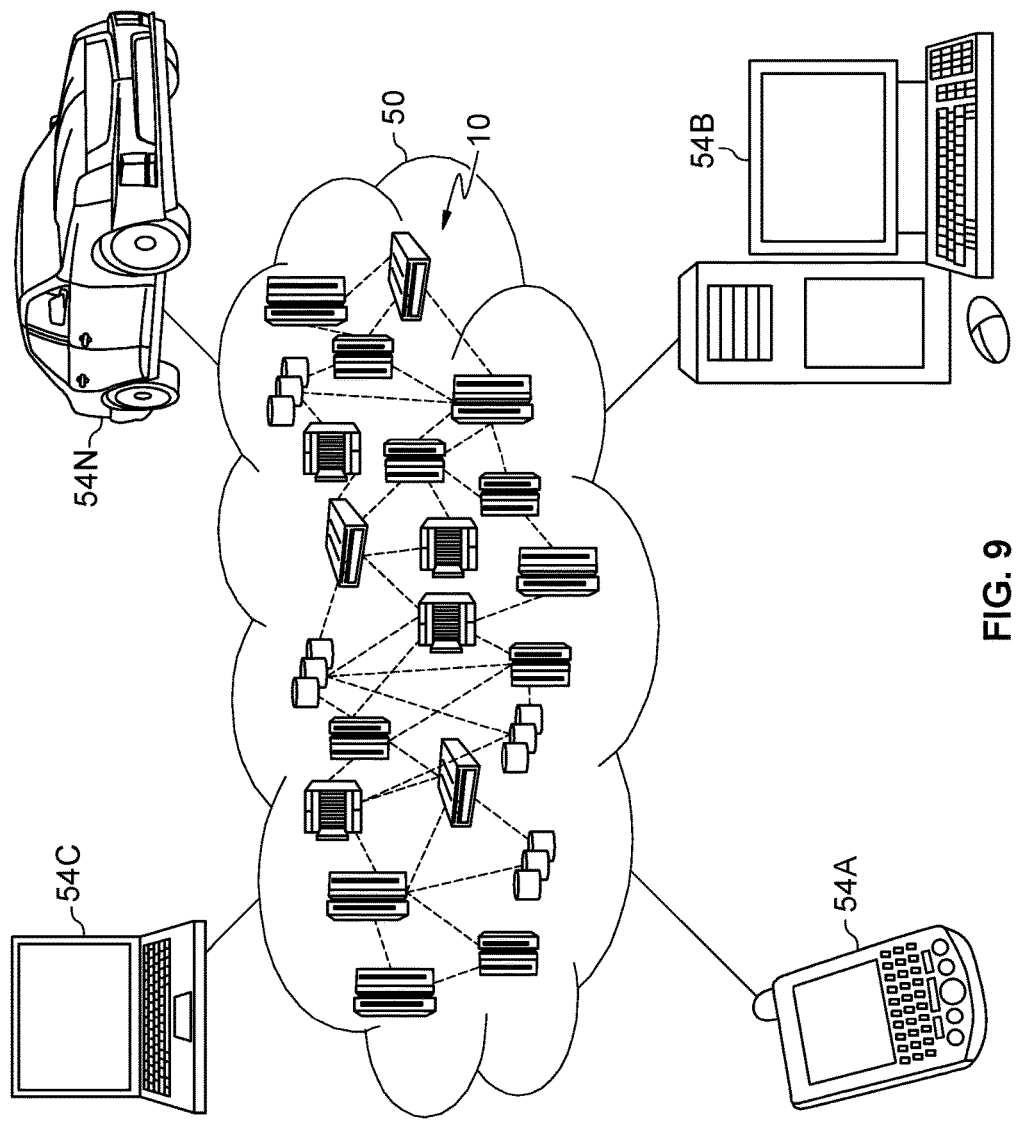
FIG. 9 depicts a cloud computing environment in accordance with example implementations of the present disclosure.

Referring now to FIG. 9, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 9 are intended to be illustrative only and that computing nodes 10 and cloud computing environment 50 can communicate with any type of computerized device over any type of network and/or network addressable connection (e.g., using a web browser).

Figure 10:
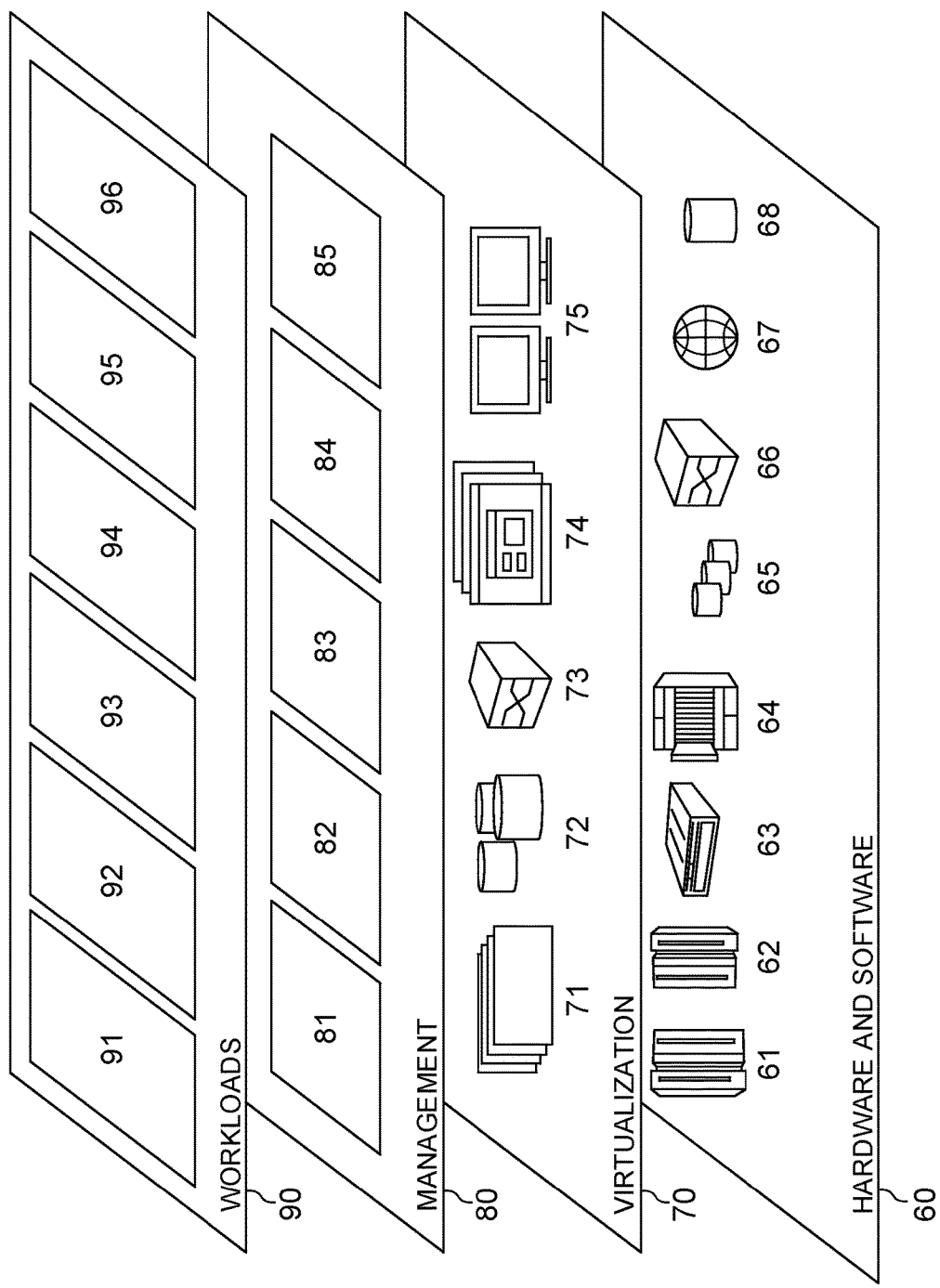
FIG. 10 depicts abstraction model layers in accordance with example implementations of the present disclosure.

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and trending topic identification 96.

Based on the foregoing, a computer system, method, and computer program product have been disclosed. However, numerous modifications and substitutions can be made without deviating from the scope of the present invention. Therefore, the present invention has been disclosed by way of example and not limitation.

While the invention has been shown and described with reference to certain exemplary embodiments thereof, it will be understood by those skilled in the art that various changes in form and details may be made therein without departing from the spirit and scope of the present invention as defined by the appended claims and their equivalents.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the one or more embodiment, the practical application or technical improvement over technologies found in the marketplace, or to enable others of ordinary skill in the art to understand the embodiments disclosed herein.

Although preferred embodiments have been depicted and described in detail herein, it will be apparent to those skilled in the relevant art that various modifications, additions, substitutions and the like can be made without departing from the spirit of the invention, and these are, therefore, considered to be within the scope of the invention, as defined in the following claims.

What is claimed is:

1. A computer implemented method, comprising:
   receiving a plurality of documents, each of the plurality of documents represented by a vector of words and associated with a point in time, wherein the received plurality of documents is received and processed in chronological order;

dividing the received plurality of documents into first time slices using a first time interval to form a plurality of consecutive sets of documents;

sub-dividing each of the plurality of consecutive sets of documents into second time slices using respective second time intervals to form one or more subsets of documents;

identifying a plurality of topics in each of the plurality of consecutive sets of documents and the one or more subsets of documents, each of the plurality of topics represented by a set of most relevant topic keywords;

clustering each of the plurality of consecutive sets of documents and the one or more subsets of documents in accordance with each of the identified plurality of topics;

comparing each of the identified plurality of topics with respect to each of the plurality of consecutive sets of documents and the one or more subsets of documents to detect patterns of changes in the set of most relevant topic keywords over time, wherein comparing each of the identified plurality of topics with respect to each of the plurality of consecutive sets of documents and the one or more subsets of documents to detect patterns of changes in the set of most relevant topic keywords over time, comprises:

identifying each of the plurality of topics from each of the plurality of consecutive sets of documents and the one or more subsets of documents of the overlapping time slices to detect patterns of changes in the set of most relevant topic keywords over time;

identifying a topic drift based on the detected patterns of changes in the set of most relevant topic keywords over time; and identifying a topic convergence based on the detected patterns of changes in the set of most relevant topic keywords over time;

redefining each of the clustered plurality of consecutive sets of documents and the one or more subsets of documents to form homogenous clusters based on the identified topic convergence;

redefining each of the clustered plurality of consecutive sets of documents and the one or more subsets of documents to form homogenous clusters based on the identified topic drift;

outputting the redefined clustered plurality of consecutive sets of documents and the one or more subsets of documents; and defining a template based on the outputted redefined clustered plurality of consecutive sets of documents and the one or more subsets of documents.

2. The method of claim 1, wherein sub-dividing each of the plurality of consecutive sets of documents into the second time slices, comprises:

sub-dividing each of the plurality of consecutive sets of documents into two or more consecutive overlapping time slices.

3. The method of claim 2, wherein a start time of each of the second time slices is later than a start time of each of the first time slices by an offset time period, wherein the offset time period increases for each of the consecutive overlapping time slices.

4. The method of claim 1, wherein identifying each of the plurality of topics from each of the plurality of consecutive sets of documents and the one or more subsets of documents of the overlapping time slices to detect patterns of changes in the set of most relevant topic keywords over time comprises:

detecting an increasing relevance of one or more topic keywords represented in multiple different topics over time, indicative of topic convergence.

5. The method of claim 4, wherein redefining each of the clustered plurality of consecutive sets of documents and the one or more subsets of documents to form homogenous clusters based on the detected patterns, comprises:

re-associating the clustered plurality of consecutive sets of documents and the one or more subsets of documents in accordance with the identified plurality of topics to a single cluster for a common identified topic, based on the detected topic convergence.

6. The method of claim 1, wherein identifying each of the plurality of topics from each of the plurality of consecutive sets of documents and the one or more subsets of documents of the overlapping time slices to detect patterns of changes in the set of most relevant topic keywords over time comprises:

detecting a decreasing relevance of one or more topic keywords represented in a particular topic over time, indicative of topic drift.

7. The method of claim 6, wherein redefining each of the clustered plurality of consecutive sets of documents and the one or more subsets of documents to form homogenous clusters based on the detected patterns, comprises:

re-associating the clustered plurality of consecutive sets of documents and the one or more subsets of documents for the particular topic to one or more new clusters in accordance with the detected topic drift.

8. The method of claim 1, wherein comparing each of the identified plurality of topics with respect to each of the plurality of consecutive sets of documents and the one or more subsets of documents to detect patterns of changes in the set of most relevant topic keywords over time, comprises:

determining delta differences between relevance scores of each of the identified plurality of topics with respect to each of the plurality of consecutive sets of documents and the one or more subsets of documents of each of the consecutive overlapping time slices, and using the delta differences to detect patterns of changes selected from the group consisting of:

increasing relevance of one or more topic keywords represented in multiple different topics over time, indicative of topic convergence; and decreasing relevance of one or more topic keywords represented in a particular topic over time, indicative of topic drift.

9. The method of claim 1, wherein identifying a plurality of topics in each of the plurality of consecutive sets of documents and the one or more subsets of documents, each of the plurality of topics represented by a set of most relevant topic keywords, comprises:

performing topic analysis on each of the plurality of consecutive sets of documents and the one or more subsets of documents, the topic analysis using Latent Dirichlet Allocation for maximum likelihood fit to identify a predefined number of the plurality of topics, wherein each of the plurality of topics is represented by the set of most relevant topic keywords and each of the plurality of topics has an associated likelihood score indicative of relevance of the keyword.

10. A computer system, comprising:

one or more computer processors, one or more computer-readable storage media, and program instructions stored on one or more of the computer-readable storage media for execution by at least one of the one or more processors, the program instructions, when executed by the at least one of the one or more processors, causing the computer system to perform a method comprising:

receiving a plurality of documents, each of the plurality of documents represented by a vector of words and associated with a point in time, wherein the received plurality of documents is received and processed in chronological order;

dividing the received plurality of documents into first time slices using a first time interval to form a plurality of consecutive sets of documents;

sub-dividing each of the plurality of consecutive sets of documents into second time slices using respective second time intervals to form one or more subsets of documents;

identifying a plurality of topics in each of the plurality of consecutive sets of documents and the one or more subsets of documents, each of the plurality of topics represented by a set of most relevant topic keywords;

clustering each of the plurality of consecutive sets of documents and the one or more subsets of documents in accordance with each of the identified plurality of topics;

comparing each of the identified plurality of topics with respect to each of the plurality of consecutive sets of documents and the one or more subsets of documents to detect patterns of changes in the set of most relevant topic keywords over time, wherein comparing each of the identified plurality of topics with respect to each of the plurality of consecutive sets of documents and the one or more subsets of documents to detect patterns of changes in the set of most relevant topic keywords over time, comprises:

identifying each of the plurality of topics from each of the plurality of consecutive sets of documents and the one or more subsets of documents of the overlapping time slices to detect patterns of changes in the set of most relevant topic keywords over time;

identifying a topic drift based on the detected patterns of changes in the set of most relevant topic keywords over time; and identifying a topic convergence based on the detected patterns of changes in the set of most relevant topic keywords over time;

redefining each of the clustered plurality of consecutive sets of documents and the one or more subsets of documents to form homogenous clusters based on the identified topic convergence;

redefining each of the clustered plurality of consecutive sets of documents and the one or more subsets of documents to form homogenous clusters based on the identified topic drift;

outputting the redefined clustered plurality of consecutive sets of documents and the one or more subsets of documents; and defining a template based on the outputted redefined clustered plurality of consecutive sets of documents and the one or more subsets of documents.

11. The computer system of claim 10, wherein sub-dividing each of the plurality of consecutive sets of documents into the second time slices, comprises:

sub-dividing each of the plurality of consecutive sets of documents into two or more consecutive overlapping time slices.

12. The computer system of claim 11, wherein a start time of each of the second time slices is later than a start time of each of the first time slices by an offset time period, wherein the offset time period increases for each of the consecutive overlapping time slices.

13. The computer system of claim 10, wherein identifying each of the plurality of topics from each of the plurality of consecutive sets of documents and the one or more subsets of documents of the overlapping time slices to detect patterns of changes in the set of most relevant topic keywords over time comprises:

detecting an increasing relevance of one or more topic keywords represented in multiple different topics over time, indicative of topic convergence.

14. The computer system of claim 13, wherein redefining each of the clustered plurality of consecutive sets of documents and the one or more subsets of documents to form homogenous clusters based on the detected patterns, comprises:

re-associating the clustered plurality of consecutive sets of documents and the one or more subsets of documents in accordance with the identified plurality of topics to a single cluster for a common identified topic, based on the detected topic convergence.

15. The computer system of claim 10, wherein identifying each of the plurality of topics from each of the plurality of consecutive sets of documents and the one or more subsets of documents of the overlapping time slices to detect patterns of changes in the set of most relevant topic keywords over time comprises:

detecting a decreasing relevance of one or more topic keywords represented in a particular topic over time, indicative of topic drift.

16. The computer system of claim 15, wherein redefining each of the clustered plurality of consecutive sets of documents and the one or more subsets of documents to form homogenous clusters based on the detected patterns, comprises:

re-associating the clustered plurality of consecutive sets of documents and the one or more subsets of documents for the particular topic to one or more new clusters in accordance with the detected topic drift.

17. The computer system of claim 10, wherein comparing each of the identified plurality of topics with respect to each of the plurality of consecutive sets of documents and the one or more subsets of documents to detect patterns of changes in the set of most relevant topic keywords over time, comprises:

determining delta differences between relevance scores of each of the identified plurality of topics with respect to each of the plurality of consecutive sets of documents and the one or more subsets of documents of each of the consecutive overlapping time slices, and using the delta differences to detect patterns of changes selected from the group consisting of:

increasing relevance of one or more topic keywords represented in multiple different topics over time, indicative of topic convergence; and decreasing relevance of one or more topic keywords represented in a particular topic over time, indicative of topic drift.

18. The computer system of claim 10, wherein identifying a plurality of topics in each of the plurality of consecutive sets of documents and the one or more subsets of documents, each of the plurality of topics represented by a set of most relevant topic keywords, comprises:

performing topic analysis on each of the plurality of consecutive sets of documents and the one or more subsets of documents, the topic analysis using Latent Dirichlet Allocation for maximum likelihood fit to identify a predefined number of the plurality of topics, wherein each of the plurality of topics is represented by the set of most relevant topic keywords and each of the plurality of topics has an associated likelihood score indicative of relevance of the keyword.

19. The computer system of claim 10, further comprising:
a chat messaging subsystem configured for receiving messages comprising text-based documents from one or more users, the chat messaging system configured for sending the plurality of documents to the one or more computer processors of the computer system.

20. A computer program product for controlling access to a secure resource, the computer program product comprising:
one or more computer-readable storage devices and program instructions stored on at least one of the one or more tangible storage devices, the program instructions comprising:
program instructions to receive a plurality of documents, each of the plurality of documents represented by a vector of words and associated with a point in time, wherein the received plurality of documents is received and processed in chronological order;
program instructions to divide the received plurality of documents into first time slices using a first time interval to form a plurality of consecutive sets of documents;
program instructions to sub-divide each of the plurality of consecutive sets of documents into second time slices using respective second time intervals to form one or more subsets of documents;
program instructions to identify a plurality of topics in each of the plurality of consecutive sets of documents and the one or more subsets of documents, each of the plurality of topics represented by a set of most relevant topic keywords;
program instructions to cluster each of the plurality of consecutive sets of documents and the one or more subsets of documents in accordance with each of the identified plurality of topics;
program instructions to compare each of the identified plurality of topics with respect to each of the plurality of consecutive sets of documents and the one or more subsets of documents to detect patterns of changes in the set of most relevant topic keywords over time, wherein comparing each of the identified plurality of topics with respect to each of the plurality of consecutive sets of documents and the one or more subsets of documents to detect patterns of changes in the set of most relevant topic keywords over time, comprises:
program instructions to identify each of the plurality of topics from each of the plurality of consecutive sets of documents and the one or more subsets of documents of the overlapping time slices to detect patterns of changes in the set of most relevant topic keywords over time;
program instructions to identify a topic drift based on the detected patterns of changes in the set of most relevant topic keywords over time; and
program instructions to identify a topic convergence based on the detected patterns of changes in the set of most relevant topic keywords over time;
program instructions to redefine each of the clustered plurality of consecutive sets of documents and the one or more subsets of documents to form homogenous clusters based on the identified topic convergence;
program instructions to redefine each of the clustered plurality of consecutive sets of documents and the one or more subsets of documents to form homogenous clusters based on the identified topic drift;
program instructions to output the redefined clustered plurality of consecutive sets of documents and the one or more subsets of documents; and
program instructions to define a template based on the outputted redefined clustered plurality of consecutive sets of documents and the one or more subsets of documents.

21. A computer implemented method, comprising:
receiving a plurality of data objects, each of the plurality of data objects represented by a vector of words and associated with a point in time, wherein the received plurality of data objects is received and processed in chronological order;
dividing the received plurality of data objects into first time slices using a first time interval to form a plurality of consecutive sets of data objects;
sub-dividing each of the plurality of consecutive sets of data objects into second time slices using respective second time intervals to form one or more subsets of data objects;
processing the plurality of data objects in each of the plurality of consecutive sets of data objects and the one or more subsets of data objects to derive clusters of the data objects according to similarity of features, wherein each of the derived clusters is represented by a most relevant set of cluster features;
identifying a plurality of cluster features in each of the plurality of consecutive sets of data objects and the one or more subsets of cluster features, each of the plurality of topics represented by a set of most relevant cluster features, wherein identifying a plurality of cluster features in each of the plurality of consecutive sets of data objects and the one or more subsets of cluster features, comprises:
identifying each of the plurality of topics from each of the plurality of consecutive sets of data objects and the one or more subsets of cluster features to detect patterns of changes in a set of most relevant topic keywords over time;
identifying a topic drift based on the detected patterns of changes in the set of most relevant topic keywords over time; and
identifying a topic convergence based on the detected patterns of changes in the set of most relevant topic keywords over time;
redefining the derived clusters of data objects to form homogenous clusters based on the identified topic convergence;
redefining the derived clusters of data objects to form homogenous clusters based on the identified topic drift;
outputting the redefined clusters of data objects; and
defining a template based on the outputted redefined clusters of data objects.

22. The computer implemented method of claim 21, wherein the data objects comprise text-based documents and the features comprise words within the text-based documents.

* * * * *